J. E. OGDEN.
CABLE HANGER.
APPLICATION FILED JAN. 11, 1913.
1,110,568.
Patented Sept. 15, 1914.
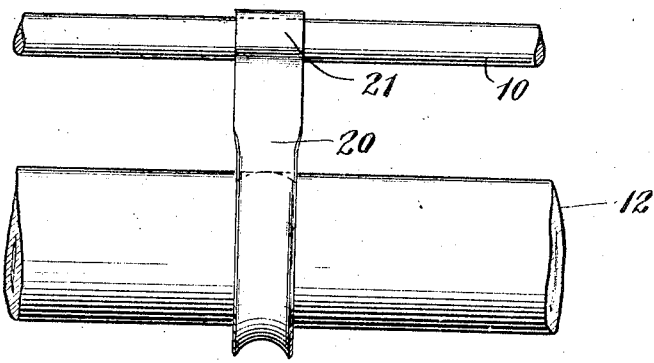
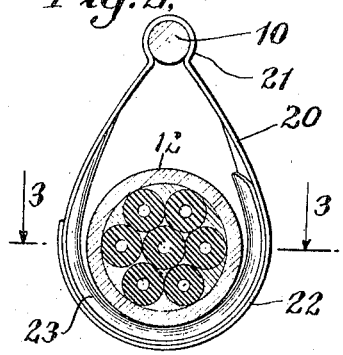
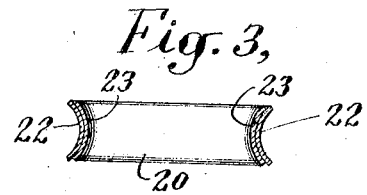
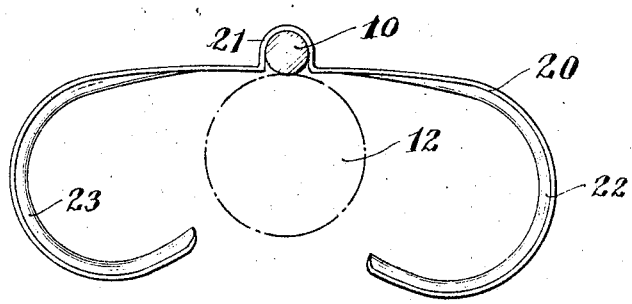
WITNESSES
INVENTOR
John Edward Ogden
BY
E. W. Marshall
ATTORNEY

UNITED STATES PATENT OFFICE.

JOHN EDWARD OGDEN, OF BROOKLYN, NEW YORK.

CABLE-HANGER.

1,110,568.  Specification of Letters Patent.  Patented Sept. 15, 1914.

Application filed January 11, 1913. Serial No. 741,381.

*To all whom it may concern:*

Be it known that I, JOHN EDWARD OGDEN, a citizen of the United States, and a resident of Brooklyn, county of Kings, and State of New York, have invented certain new and useful Improvements in Cable-Hangers, of which the following is a specification, reference being had to the accompanying drawings, forming a part thereof.

This invention relates to the art of suspending cables such for example as lead covered cables containing insulated wires, from messenger or supporting wires. Its object is to provide a hanger by which cables may be suspended as above indicated.

I will describe my invention in the following specification and point out the novel features thereof in appended claims.

Referring to the drawings; Figure 1 is a side elevation of a hanger, constructed in accordance with my invention, as applied to a messenger wire and cable, only short sections of these being shown. Fig. 2 is a view at right angles to Fig. 1, with the cable and messenger wire shown in cross section. A sectional plan view, of the hanger alone, on the line 3—3 of Fig. 2 is shown in Fig. 3. The hanger is shown open in Fig. 4 as it first appears when hung on a messenger wire before it has been applied to a cable.

Like characters of reference designate corresponding parts in all the figures.

10 designates a supporting or messenger wire which may be secured to poles or otherwise suspended and carries a cable 12. The cable may be lead covered and comprise a plurality of insulated wires but as it forms no part of my invention its construction is of no importance.

A large number of spaced hangers 20 (only one of which is shown) are clamped onto the messenger wire 10 and support the cable 12. The hanger illustrated is an embodiment of my invention and comprises, a loop 21 at the top to grip the messenger wire and a pair of hooks 22 and 23 which are adapted to be interlocked about the cable. The hooks are similar to each other but one of them is preferably bent to a slightly larger radius in order to enable them to fit together closely. The hanger is first formed as shown in Fig. 4 with the loop 21 open to receive the messenger wire and the hooks 22 and 23 separated to allow the cable to pass between their ends. The open hanger is first hung on the messenger wire as shown in Fig. 4 then the cable is brought up close under the messenger wire between the ends of the hook, to the position shown in dotted lines. The hooks are then forced together side by side around the cable thereby clamping the messenger wire in the loop as shown in Fig. 2. The hanger is thus prevented from slipping out of place on the messenger wire. Its two hooks are then moved toward each other into alinement. The clamping power of the loop is materially increased by reason of its shape, it being arranged to engage the messenger wire for more than one half the circumference of the wire. The clamping power is also very much greater than could be secured by completely forming the loop on the wire instead of first forming an open loop and then closing the same on to the messenger wire. Each of the hooks is curved in cross section to enable the two to interlock as shown in Figs. 2 and 3, when they are finally forced one within the other.

The material of which the hanger is constructed is more or less resilient and hence the hooks snap into their interlocked position and thus resist unlocking. The curved section of each hook is preferably concave outward in order to provide a smooth convex inner surface which will not abrade the outer surface of the cable if the cable is pulled through the closed hooks. I prefer to utilize galvanized strap iron or steel having the desired section for interlocking and flattened at the part which forms the clamping loop for the messenger wire. A wire may be used instead of iron or steel strap but the strap even though it is relatively narrow grips the messenger wire more firmly. The hooks may have some other cross section which will provide the desired interlock and I do not limit myself in this respect to the structure shown.

What I claim is:

1. A cable hanger comprising a single punching or stamping of resilient sheet metal formed to compose a loop adapted to engage a messenger wire, and a pair of similar hooks curved toward each other extending from opposite ends of the loop and having correspondingly curved cross-sections whereby they are adapted to be forced oppositely around a cable and sprung into an interlocking position.

2. A cable hanger comprising a single punching or stamping of resilient sheet metal formed to compose a clamping loop adapted to grip a messenger wire, and a pair of sister hooks having correspondingly curved cross-sections, distended from the loop and adapted to be forced oppositely around a cable and sprung into an interlocking position in which the hooks are nested together.

In witness whereof I have hereunto set my hand this 10th day of January in the year 1913.

JOHN EDWARD OGDEN.

Witnesses:
    J. B. MOORE,
    M. KRAELER.